March 14, 1950   F. R. ELLENBERGER   2,500,746
POSITION RECORDER
Filed Nov. 18, 1947
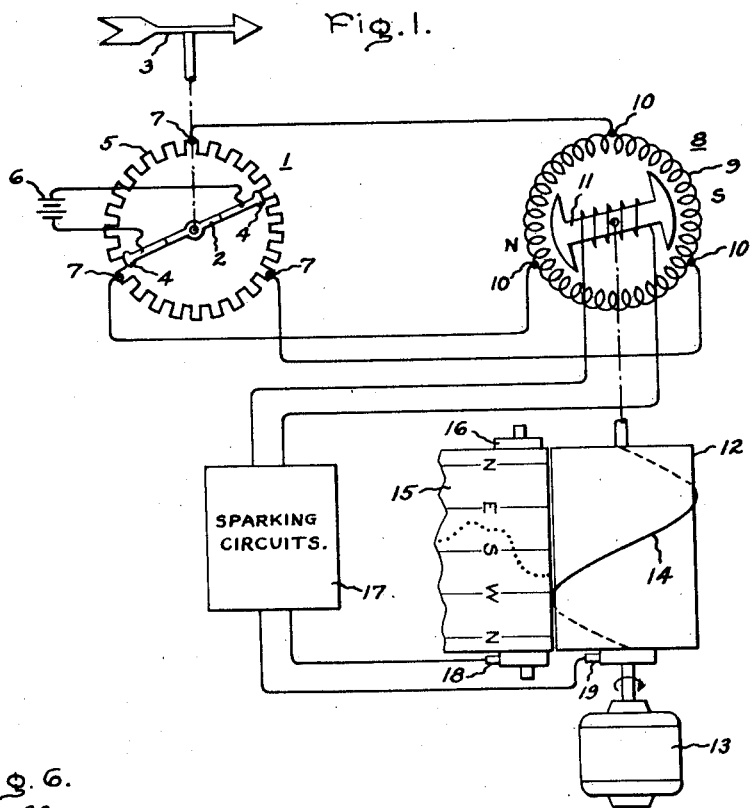
Fig.1.
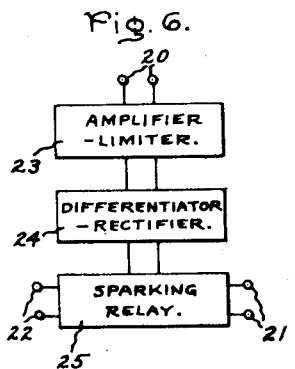
Fig.2.
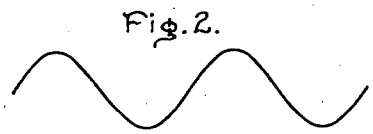
Fig.3.
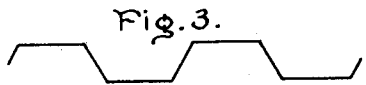
Fig.4.
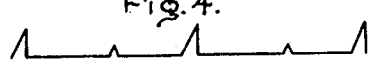
Fig.5.
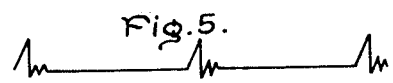
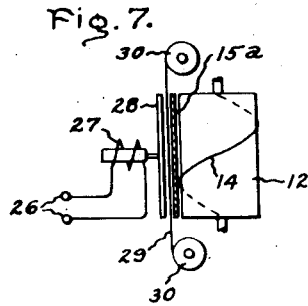
Inventor:
Francis R. Ellenberger,
by *Prowell S. Mack*
His Attorney.

Patented Mar. 14, 1950

2,500,746

UNITED STATES PATENT OFFICE 2,500,746

POSITION RECORDER

Francis R. Ellenberger, Bloomfield, N. J., assignor to General Electric Company, a corporation of New York Application November 18, 1947, Serial No. 786,757

8 Claims. (Cl. 346—31)

My invention relates to an improved position recorder, and more particularly to improved apparatus for graphically recording the indication of a direct current Selsyn telemetering receiver.

In the class of remote position indicators commonly known as direct current Selsyns, the transmitter usually comprises a rheostat or potentiometer having two movable taps adapted to be positioned responsive to a value to be remotely indicated, three or more fixed taps, and means to apply a D.-C. voltage between the two movable taps, so that voltages are obtained at the respective fixed taps which vary in their relative magnitudes and polarities responsive to changes in the value to be remotely indicated. The receiver usually comprises a substantially toroidal or semi-toroidal coil having a number of fixed taps corresponding to the number of fixed taps in the transmitter, and a magnet rotatable about the axis of such coil. When each fixed tap in the receiver is electrically connected to a corresponding fixed tap in the transmitter, variations in the value to be remotely indicated cause changes in position of the magnetic field produced by electric currents flowing in the receiver coil, and the receiver magnet is rotated responsive to these changes. Attached to the magnet there may be a pointer, which may cooperate with an appropriately calibrated scale. Several forms and modifications of such transmitters and receivers are illustrated in U. S. Patents Nos. 2,184,347; 2,197,636; 2,248,616; 2,274,415 and 2,294,741.

When it is desired to graphically record the quantity indicated by such a direct current receiver, it is often found that the output torque of the receiver is too small to operate conventional recording apparatus directly. In such cases relatively elaborate follow-up mechanisms have been used to operate a recorder responsive to the Selsyn receiver indications.

The object of my invention is to provide improved and simplified apparatus for receiving and recording such remote position indications.

The features of my invention which are believed to be novel and patentable are pointed out in the claims appended hereto. For a better understanding of my invention, reference is made in the following description to the accompanying drawing in which Fig. 1 is a schematic diagram of one form of my invention; Figs. 2 through 5 are oscillograms of electrical waveforms hereinafter described; Fig. 6 is a detailed schematic diagram of a preferred form of the sparking circuits in the apparatus of Fig. 1; and Fig. 7 is a schematic diagram of a printing recorder adapted for use with my invention.

Referring now to Fig. 1, a direct current transmitter 1 has a rotor 2 adapted to be rotated by a weather vane 3. The rotor and the vane may be on a common shaft or otherwise ganged together, as conventionally indicated in the drawing by a broken line. A weather vane is shown merely for illustration: the apparatus shown is adapted to remotely record any value responsive to which the angular position of rotor 2 can be varied. For example, linear position can be measured by providing a rack and gear on the rotor shaft of the transmitter shown, or a transmitter directly responsive to such linear position may be employed. A transmitter of the latter type is described in U. S. Patent No. 2,184,347. Rotor 2 has two contactors 4 which respectively make electrical contact with diametrically opposite points on a continuous circular rheostat 5. A battery 6, or other source of D.-C. voltage, is connected as shown to the two contactors, and thereby supplies a voltage between two diametrically opposite points on rheostat 5 which rotate responsive to changes in the angular position of the weather vane. Three fixed taps 7 are preferably equally spaced around rheostat 5.

Receiver 8 has a field coil 9 which, for example, may be a continuous toroidal coil as shown. Coil 9 has three fixed taps 10, preferably equally spaced around the coil, respectively connected to the corresponding fixed taps on rheostat 5. As is well known in the art, electric currents flow from the transmitter through the field coil of the receiver, and thereby produce at the receiver a direct magnetic field whose direction or angular position varies responsive to changes in the angular position of the transmitter rotor. In the drawing, the letters "N" and "S" represent the equivalent north and south poles for one position of such magnetic field. My invention is not limited to the form of transmitter and receiver field coil shown, but is adapted for use in any telemetering system in which a magnetic field is produced at the receiver whose direction or angular position varies responsive to a value to be remotely indicated.

In the receiver, I provide an armature 11 continuously rotated about the axis of field coil 9 and having a single-phase winding positioned to move in a plane parallel to the field directions so that the flux linkage of the armature winding with the direct magnetic field produced by coil 9 varies as the armature is rotated. Thus, an alternating voltage is induced in the armature winding as the armature is rotated, whose phase relative to the rotation cycle of the armature varies responsive to changes in the direction or angular position of the magnetic field produced by coil 9.

In the recorder, a drum 12 is rotated in synchronism with armature 11 by a motor 13. Armature 11 and drum 12 may have a common shaft, or may be otherwise ganged together, as is conventionally indicated in the drawing by a broken line. A single turn, electrically conducting helix 14 extends about drum 12, and a sheet of electric spark recording paper 15 passes between drum 12 and an electrically conducting roller 16, as shown. Paper 15 is of the type adapted to have an electric spark pass therethrough, and to have a visible mark made thereon by the passage of such spark. Conventional means, not shown, are employed to move the paper past the roller at the desired recording rate.

The electric spark recording paper referred to herein need not necessarily be paper which is responsive only to high-voltage electric sparks. Current-sensitive paper which does not require a high voltage spark also gives good results. It is intended that the term "electric spark recording paper" used herein shall include low-voltage current-sensitive paper, and that the term "spark" shall include low-voltage electric currents which flow through such paper.

Sparking circuits 17, which may be a combination of conventional electronic circuits as hereinafter described, are electrically connected to armature 11 as shown, and are connected through brushes 18 and 19 to roller 16 and helix 14. These circuits are adapted to produce, once during each cycle of the alternating voltage induced in the winding of armature 11 and in fixed phase relationship thereto, a pulse of voltage between roller 16 and helix 14 of sufficient amplitude to produce an electric spark between the roller and the helix. For example, the sparking circuits may be adapted to produce such a spark each time the voltage induced in the winding of armature 11 passes through zero value in changing from negative to positive values. This spark passes through electric spark recording paper 15 and produces a mark thereon. As the angular position of the magnetic field produced by coil 9 varies responsive to changes in the value remotely recorded, the phase of the electric sparking pulse relative to the rotation cycle of drum 12 varies, and the portion of helix 14 which is nearest roller 16 at the time the spar occurs will likewise vary. Thus, the successive marks upon paper 15 vary in position on the paper responsive to changes in the remotely recorded value, and the line formed by such successive marks is a graphic record of such value.

A preferred form of sparking circuits 17 is schematically illustrated in more detail in Fig. 6. Referring now to this figure, terminals 20 are connected to the winding of receiver armature 11; terminals 21 are respectively connected to brushes 18 and 19, and terminals 22 are connected to a voltage source adapted to supply the spark-producing voltage. The three electronic stages, an amplifier-limiter 23, a differentiator-rectifier 24, and a sparking relay 25, may be conventional vacuum tube circuits which are well known and need not be described in detail here. For a better understanding of the operation of these circuits, reference is made in the following description to the oscillograms represented in Figs. 2 through 5.

The voltage induced in the winding of armature 11 is substantially sinusoidal, as illustrated in Fig. 2. Amplifier-limiter 23, which may be a single vacuum tube stage or may be several stages in series if the induced voltage is small, alters the voltage waveform to an imperfect square wave as illustrated in Fig. 3. Differentiator-rectifier 24 produces a series of voltage pulses as illustrated in Fig. 4, and sparking relay 25, which may be a fast-acting vacuum tube relay, closes an electric circuit between terminals 21 and 22 each time a pulse of sufficient magnitude is received from differentiator-rectifier 24, thus producing across terminals 21 the sparking voltage pulses illustrated in Fig. 5. These sparking voltage pulses are in fixed phase relationship to the voltage induced in the winding of armature 11, one such pulse occurring each time the induced voltage passes through its average or zero value in changing from negative to positive values. Sparking relay 25 may be replaced by an amplifier adapted to amplify the electric pulses from the differentiator-rectifier sufficiently to provide the necessary voltage and power to produce a spark. Such replacement does not alter the principle involved. Other modifications of the electronic circuits to produce a sparking voltage pulse once each cycle of the voltage induced in the armature 11 winding, and in fixed phase relation thereto, are within the skill of those versed in the art.

Referring now to Fig. 7, I have shown a printing recorder adapted for use in my invention. Drum 12 and helix 14 rotate as hereinbefore explained. Chart paper 15a need not be spark sensitive. The electric pulses, which in the apparatus hereinbefore described produced sparks, are now applied to terminals 26, actuate solenoid 27 and cause tapper bar 28 to press paper 15a against helix 14. This pressure causes typewriter ribbon 29 to print a mark on paper 15a at a point determined by the position of helix 14. Spools 30 are ribbon spools supporting the typewriter ribbon. Those skilled in the art will perceive that numerous modifications of the apparatus shown can be effected without altering the principle of my invention.

The accuracy of my apparatus is not affected by variations in the speed of rotation of armature 11 and drum 12 as long as the two remain in synchronism. However, it is preferable that they rotate at least ten times as fast as the anticipated maximum speed of rotation of rotor 2 in order to provide a substantially continuous record of the rotor position, and it may be desirable that the armature 11 rotate much faster than this to provide an induced voltage of greater amplitude.

In accordance with the provisions of the patent statutes, I have described the principle of my invention, together with the apparatus which I now consider to represent the best embodiment thereof; but I wish it to be understood that the apparatus described is illustrative only, and that the invention can be carried out by other means.

What I claim as new and desire to secure by Letters Patent of the United States is:

1. A position recorder for making a graphic record of the recorded position upon electric spark recording paper, comprising a direct-current transmitter responsive to the recorded position, a receiver of the type which produces a direct magnetic field the angular position of which varies responsive to changes in the recorded position, an armature rotated within said magnetic field and having a winding in magnetic flux linkage with said field positioned to move in a plane parallel to the field directions so that such flux linkage varies as the armature is rotated, thus inducing an alternating voltage in said winding, a drum rotated about its own axis and having a single-turn, electrically conducting helix extending about its periphery, means to rotate said armature and said drum continuously in synchronism, an electrically conducting roller placed adjacent to the drum with the recording paper between said roller and said drum, and sparking circuits comprising an amplifier-limiter connected in voltage responsive relation to said armature winding, a differentiator-rectifier connected in voltage-responsive relation to the output of said amplifier limiter, and means including a relay connected to be actuated by the output of said differentiator-rectifier to produce an electric spark between said helix and said roller once during each cycle of the alternating voltage induced in the armature winding and in fixed phase relationship thereto.

2. A position recorder for making a graphic record on a chart of the recorded position, comprising a transmitter to transmit a signal which varies responsive to the recorded position, a receiver of the type which produces a direct magnetic field the angular position of which varies responsive to variations in said signal, an armature rotated within said magnetic field and having a winding in magnetic flux linkage with said field positioned to move substantially in a plane parallel to the field directions so that such flux linkage varies as the armature is rotated, thus inducing an alternating voltage in said winding, a single turn helix rotated about its own axis, means to rotate said armature and said helix continuously in synchronism, the chart position being adjacent to said helix, and means connected in voltage-responsive relation to said armature winding to produce a mark upon said chart substantially at its point of contact with said helix at a predetermined point in each cycle of said induced alternating voltage.

3. A recording telemetric receiver for producing a graphic record of the telemetered quantity on electric spark recording paper, comprising a field coil of the type which produces a direct magnetic field the angular position of which varies responsive to changes in the telemetered quantity, an armature rotated within said magnetic field and having a single-phase winding in magnetic flux linkage with said field positioned to move substantially in a plane parallel to the field directions so that such flux linkage varies as the armature is rotated, thus inducing an alternating voltage in said winding, a drum rotated about its own axis and having an electrically conducting helix extending about its periphery, means to rotate said armature and said drum continuously in synchronism, an electrically conducting member adjacent to said drum, the recording paper position being between said member and said drum, sparking circuits connected in voltage-responsive relation to said armature winding and having terminals connected to said helix and said member respectively to produce an electric spark between said helix and said member once during each cycle of the alternating voltage induced in the armature winding, such spark always occurring during the same portion of said cycle.

4. A recording telemetric receiver for producing a graphic record of the telemetered quantity on a chart, comprising a field coil of the type which produces a direct magnetic field the angular position of which varies responsive to changes in the telemetered quantity, an armature rotated within said magnetic field and having a single-phase winding in magnetic flux linkage with said field positioned to move substantially in a plane parallel to the field directions so that such flux linkage varies as the armature is rotated, thus inducing an alternating voltage in said winding, a helical member rotated about its own axis, means to rotate said armature and said helical member continuously in synchronism, the chart being adjacent to said helical member, means connected in voltage-responsive relation to said armature winding and including a tapper bar to press the chart against the helical member at a predetermined cyclical position of said induced alternating voltage, and means to produce a mark upon said chart substantially at its point of contact with said helical member when such pressure is applied.

5. A recording telemetric receiver for producing a graphic record of the telemetered quantity on a chart, comprising a field coil of the type which produces a direct magnetic field the angular position of which varies responsive to changes in the telemetered quantity, an armature rotated within said magnetic field and having a single-phase winding in magnetic flux linkage with said field positioned to move substantially in a plane parallel to the directions of said field so that such flux linkage varies as the armature is rotated, thus inducing an alternating voltage in said winding, a helical member rotated about its own axis, means to rotate said armature and said helical member continuously in synchronism, the chart being adjacent to said helical member, and means connected in voltage-responsive relation to said armature winding to produce a mark upon said chart substantially at its point of contact with said helical member at a predetermined cyclical position of said induced alternating voltage.

6. A recording telemetric receiver for use with a direct current transmitter, comprising means to produce a direct magnetic field the angular position of which varies responsive to changes in the telemetered quantity, an armature rotated within said magnetic field and having a winding in magnetic flux linking relation therewith positioned to move in a plane substantially parallel to directions of the field so that an alternating voltage is induced in said winding when said armature is rotated, the phase of such voltage relative to the rotation cycle of the armature varying responsive to changes in the angular position of said magnetic field, means to rotate said armature continuously, and recording means connected in voltage-responsive relation to said armature winding for exhibiting said relative phase variations of the induced voltage.

7. Apparatus for recording upon electric recording paper the angular position of a direct magnetic field, comprising an armature rotated within said magnetic field and having a winding in magnetic flux linking relation to said field positioned to move in a plane substantially parallel to directions of said field so that an alternating voltage is induced in said winding when said armature is rotated, a helix rotated about its own axis, means to rotate said armature and said helix continuously in synchronism, a member adjacent to said helix, the recording paper position being between said member and said helix, and means connected in voltage-responsive relation to said armature winding to produce an electric current between said helix and said member during a fixed portion of each cycle of the alternating voltage induced in the armature winding.

8. Apparatus for recording upon a chart the angular position of a direct magnetic field, comprising an armature rotated within said magnetic field and having a winding in magnetic flux linkage with said field positioned to move in a plane substantially parallel to directions of said field so that an alternating voltage is induced in said winding when said armature is rotated, a helical member rotated about its own axis, means to rotate said armature and said helical member continuously in synchronism, the recording paper being adjacent to said helical member, and means to produce a mark upon said chart substantially at its point nearest said helical member at a predetermined cylical position of said induced alternating voltage.

FRANCIS R. ELLENBERGER.

REFERENCES CITED

The following references are of record in the file of this patent:

UNITED STATES PATENTS

| Number | Name | Date |
| --- | --- | --- |
| 1,597,828 | Roucke | Aug. 31, 1926 |
| 1,620,405 | Sprenger | Mar. 8, 1927 |
| 2,135,028 | Bokovoy et al. | Nov. 1, 1938 |
| 2,143,233 | Wallace | Jan. 10, 1939 |
| 2,400,828 | Keinath | May 21, 1946 |
| 2,434,531 | Wilson et al. | Jan. 13, 1948 |